United States Patent [19]
Jacobson

[11] Patent Number: 5,493,600
[45] Date of Patent: Feb. 20, 1996

[54] QUALITY CONTROL FILM CASSETTE FOR AN X-RAY IMAGING SYSTEM

[75] Inventor: Donald R. Jacobson, Waukesha, Wis.

[73] Assignee: MCW Research Foundation, Milwaukee, Wis.

[21] Appl. No.: 344,249

[22] Filed: Nov. 23, 1994

[51] Int. Cl.$^6$ .................................................. G01D 18/00
[52] U.S. Cl. ............................ 378/207; 378/162; 378/166
[58] Field of Search .................................... 378/162, 166, 378/207

[56] References Cited

PUBLICATIONS

"Take a Perfect Radiograph . . . With EXPOSURE," Fairchild Medical Systems, Inc.
"MAMMO–AEC METER Automatic Exposure Control Meter," Diagnostic Imaging Specialists Corporation.

*Primary Examiner*—Craig E. Church
*Attorney, Agent, or Firm*—Quarles & Brady

[57] ABSTRACT

An apparatus for testing an X-ray imaging system includes a cassette with a section for receiving a sheet of photographic film. An intensifier screen emits light upon being stuck by X-rays and is positioned within the cassette so that the light strikes the photographic film. A light sensor produces an electrical signal representing the intensity of light emitted by the intensifier screen and an electrometer integrates the signal. A first analog to digital converter produces a digital value that corresponds to the magnitude of the integrated signal. The digital value is recorded on the photographic film by a light emitting numerical display. A control circuit activates the numerical display after an X-ray exposure has terminated so that the value recorded on the film represents the magnitude of that exposure.

14 Claims, 2 Drawing Sheets

5,493,600

QUALITY CONTROL FILM CASSETTE FOR AN X-RAY IMAGING SYSTEM

BACKGROUND OF THE INVENTION

The present invention relates to X-ray imaging systems, and particularly to devices for evaluating the operation of the imaging system.

Medical imaging systems, such as used in mammography, transmit X-rays from a source through the object being imaged and on to photographic film in a cassette. As much as 95 percent of the X-rays pass through the photographic film without producing a significant change in the film. In order to enhance the image on the photographic film, an intensifying screen is placed in the cassette in contact with the film. This screen comprises a transparent sheet on which is deposited a layer of phosphor that produces visible light when bombarded with X-rays and which is much more responsive to X-rays than the photographic film. The film reacts to the light from the screen as in conventional photography. Thus, when the photographic film is developed, the areas exposed to greater amounts of light will be darker than those areas which were exposed to less light.

In the United States, mammography X-ray systems have to be certified periodically by the U.S. Food and Drug Administration. Such certification involves producing a test image of a "phantom" object which simulates human tissue using a defined set of parameters for exciting the X-ray tube. The radiation exposure is often measured by a thermal luminescent dosimeter (TLD) that contains lithium fluoride crystals which, when heated after being exposed to X-rays, emit light in an amount that corresponds to the magnitude of the X-rays that struck the dosimeter. The certification process involves sending the exposed dosimeter to a designated laboratory which determines the X-ray exposure by measuring the amount of light given off by the crystals upon heating. The photographic film which recorded an image of the test phantom is sent to an accrediting agency recognized by the U.S. Food and Drug Administration which also receives the X-ray exposure measurement from the laboratory. This certification method requires separate processing of the photographic film and the thermal luminescent dosimeter and uses separate paths to deliver the results to the accrediting agency.

At other times, it is desirable for quality control purposes that the X-ray equipment user be able to conduct test exposures to evaluate the performance of the X-ray imaging system and the film processor that develops the photographic film. For such quality control tests, photographic film may be exposed using a phantom that contains an attenuating step wedge to produce an image on the film having areas of different optical densities. It is desirable to know the X-rays exposure of the test procedure in order to correlate the densities of the developed film to an amount of radiation to which the screen-film combination was exposed.

SUMMARY OF THE INVENTION

An object of the present invention is to provide an X-ray film cassette that has an integral dosimeter for measuring the amount of radiation to which screen-film combination in the cassette is exposed. The present invention measures the intensity of the light emitted by an intensifying screen in the cassette which converts the X-rays to visible light.

Another object of the present invention is to provide such a mechanism which numerically records the measurement of the X-ray exposure on the photographic film along with a test image.

A further object of the present invention is to quantify the actual light exposure of the film for the purpose of evaluating the efficiency of the film processor.

An apparatus for evaluating an X-ray imaging system comprises a cassette with a section that holds a sheet of photographic film. An intensifier screen of a material that emits light in response to being stuck by X-rays is positioned within said cassette so that the emitted light will strike the photographic film. A light sensor produces an electrical signal in response to receiving light from said intensifier screen.

A circuit is connected to said light sensor and produces a digital value representing an amount of light which strikes said light sensor. In the preferred embodiment, this circuit includes an integrator and an analog to digital converter. The integrator produces an output signal that corresponds to the integration of the electrical signal received from the light sensor. The analog to digital converter receives the output signal from the integrator and produces a digital value representing a magnitude of the output signal.

A light emitting device, such as a multi-digit decimal display located within the film cassette, is connected to the circuit to record the digital value on the photographic film. Preferably a control mechanism is provided to briefly activate the light emitting device after an X-ray exposure terminates so that the value recorded on the photographic film represents the magnitude of the X-ray exposure.

An additional remote display for presenting the digital value to the user also is described.

DETAILED DESCRIPTION OF THE INVENTION

Figure 1:
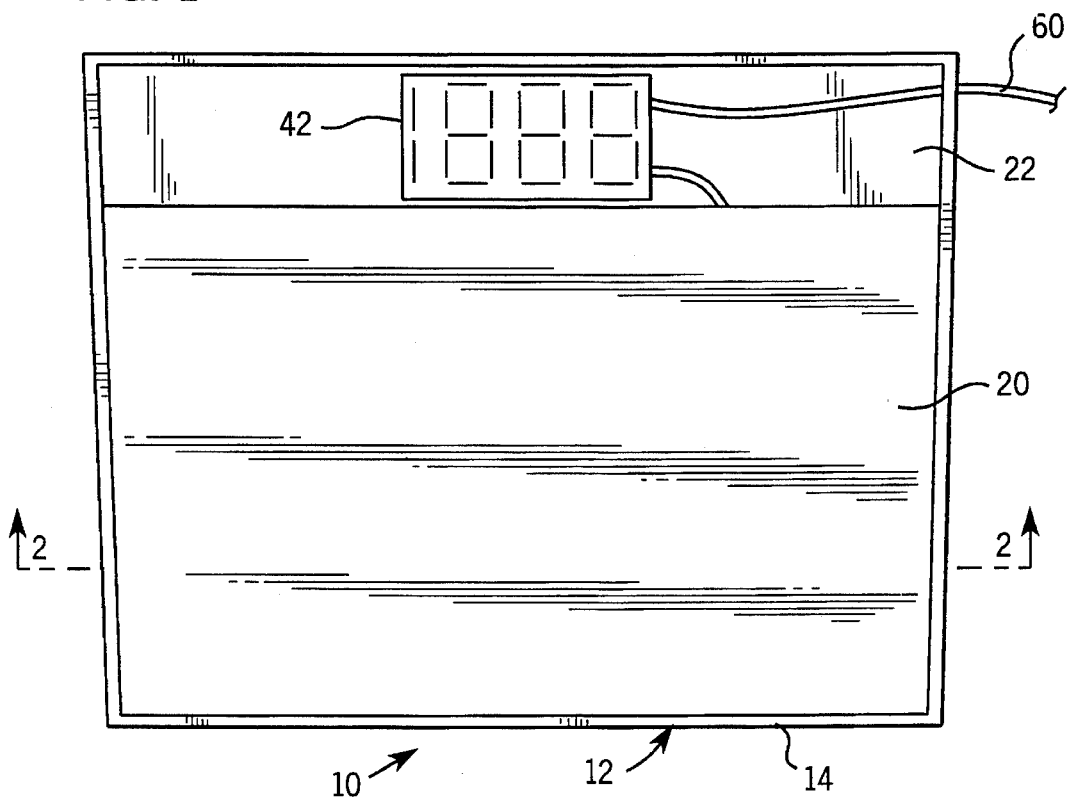
FIG. 1 is a plane view of an X-ray film cassette according to the present invention with a cover removed.
Figure 2:
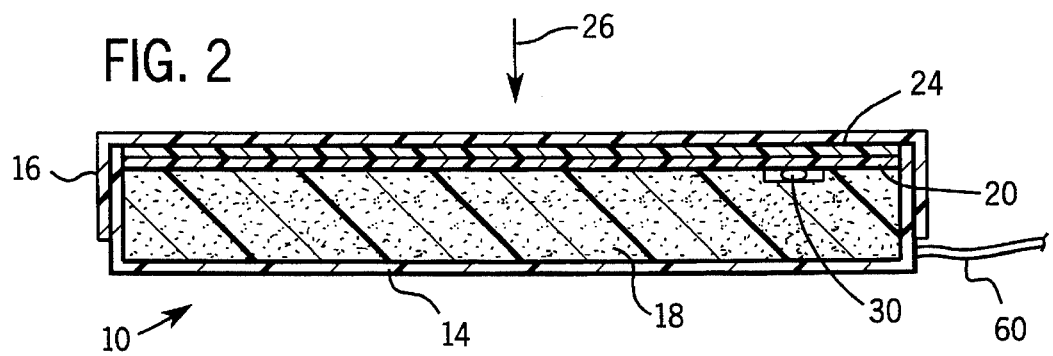
FIG. 2 is a cross-section view along line 2—2 in FIG. 1 of a cassette with the cover in place and containing photographic film.

With initial reference to FIGS. 1 and 2, an X-ray film cassette 10 has a housing 12 formed by a tray 14 and a cover 16. The tray 14 has a rectangular base with four side walls and an open top and the cover 16 has a rectangular top and four side walls adapted to snugly fit over the top of the tray 14 in a manner which prevents light from entering the interior of housing 12. A pad 18 of resilient foam is placed in the bottom of the tray 14. On top of the pad 18 is a conventional intensifying screen 20 formed by a layer of phosphor applied to a flexible, transparent sheet in which the phosphor emits visible light when struck by X-rays. As shown in FIG. 1, the intensifying screen does not extend across the entire interior of tray 14, thereby creating an area 22 along one side of the tray which is not covered by intensifying screen 20.

As shown in FIG. 2, a sheet of photographic film 24 of the type commonly used for X-ray imaging is on top of the screen 20 and held against the cover 16 by the resiliency of pad 18. The photographic film 24 extends across the entire interior of tray 14 including not just the intensifying screen 20, but also area 22 of the tray interior.

During an exposure, X-rays which have passed through the object being imaged (for example a test phantom) travel through the top cover 16 of the cassette in a direction indicated by arrow 26 in FIG. 2. The X-rays pass through the sheet of photographic film 24 and strike the intensifying screen 20. The impingement of X-rays upon the intensifying screen 20 causes the phosphor of the screen to emit light, some of which travels upward striking the photographic film 24. Because the intensity of the light emitted by the phosphor material depends upon the magnitude of the X-rays striking that portion of the screen 20, an image is created on the photographic film 24.

Some of the light emitted by the phosphor material of the intensifying screen 20 travels downward striking the resilient foam pad 18. A photodiode 30 is placed between the pad 18 and the underside of the intensifying screen 20 and receives some of the light emitted by the impingement of X-rays upon the intensifying screen. The photodiode 30 produces an electrical signal that is proportional to the intensity of the light that strikes the photodiode.

Figure 3:
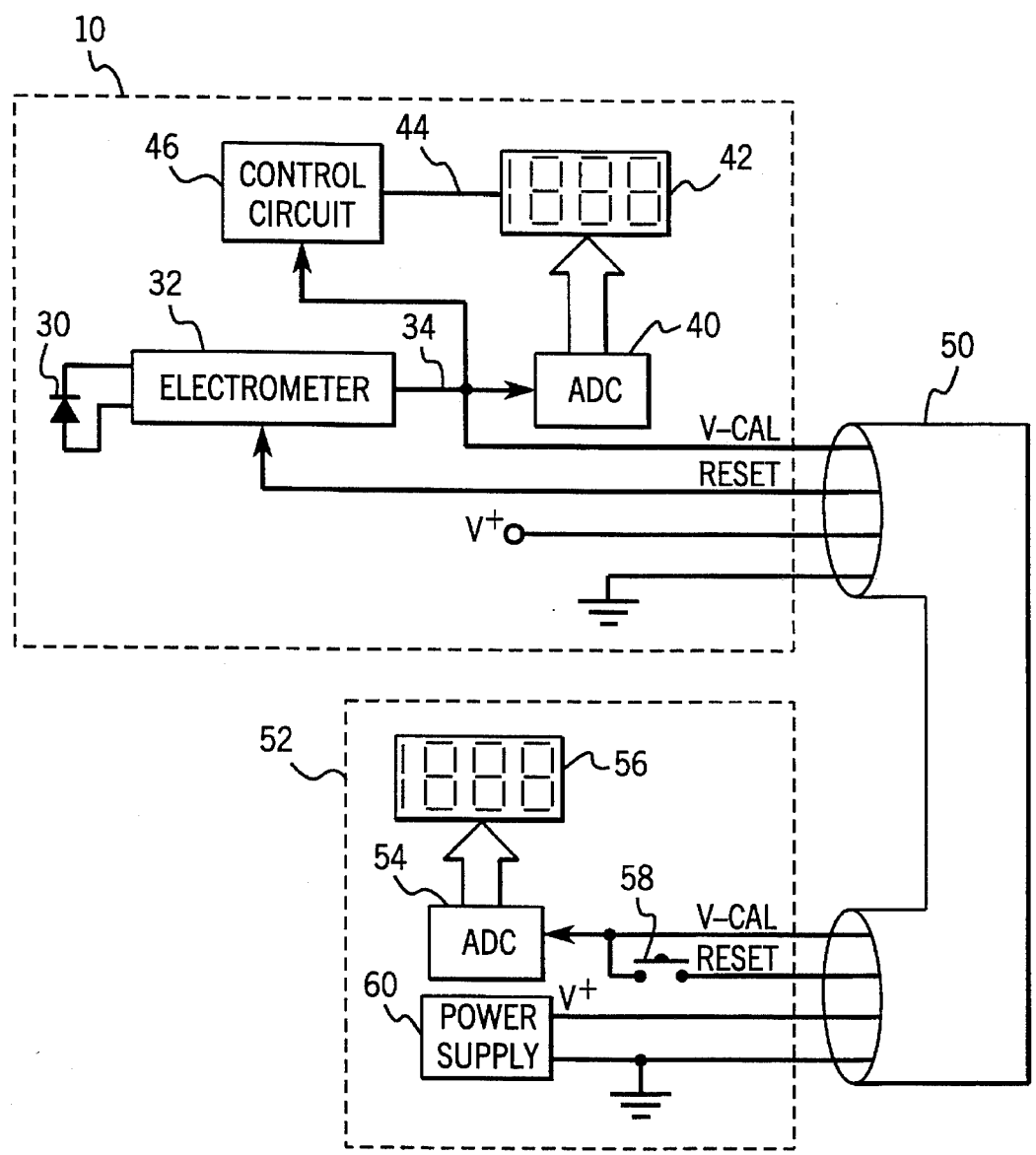
FIG. 3 is a schematic diagram of the electrical circuit which measures, displays and imprints the X-ray exposure magnitude on the film.

Referring to FIG. 3, the photodiode 30 is connected to the inputs of an integrating electrometer amplifier 32, hereinafter referred as an "electrometer." The electrometer 32 integrates the electrical signal produced by the photodiode 30 so that at the end of an X-ray exposure, the voltage level at the output 34 of the electrometer corresponds to the amount of light emitted by the intensifier screen 20 which struck the photodiode. Because that amount of light is directly related to the magnitude of the X-rays which struck that portion of the intensifier screen 20, the output voltage of the electrometer directly corresponds to the X-ray exposure.

The output signal from the electrometer 32 is applied to the input of an analog to digital converter (ADC) 40. In the preferred embodiment, the analog to digital converter 40 is a single integrated circuit that contains all the devices for converting the analog input to a multi-digit, decimal numerical value and driving a decimal display to visually present that numerical value. Alternatively, a standard analog to digital converter that produces a binary output may be used, in which case additional circuits are required to transform the binary value into decimal form and drive a display. In either version, the analog to digital converter is configured with the direct relationship between the integrated signal from the photodiode 30 and the X-ray exposure value. This configuration is accomplished by appropriate selection of scaling factors for the analog to digital converter 40. As a result the numerical value produced by the analog to digital converter is a measurement of the X-ray exposure in milli-Roentgens. The outputs of analog to digital converter 40 are connected to a three and one-half digit, seven-segment light emitting diode (LED) display 42 which is mounted within area 22 inside the tray 14 with the light emitting diode segments facing the photographic film 24 when the X-ray film cassette 10 is fully assembled.

The LED display 42 has a common anode which is connected to terminal 44 and activated at the end of the X-ray exposure by a positive voltage from a control circuit 46. Normally the control circuit connects display terminal 44 to circuit ground. The control circuit 46 uses the output signal from the electrometer as an indication of when an X-ray exposure commences and a predefined interval after that commencement, the control circuit briefly applies a positive voltage to the common anode terminal 44 which action illuminates the LED display 42. The predefined interval is longer than the longest X-ray exposure used for quality control purposes. Alternatively, the control circuit 46 detects when the output signal of the electrometer 32 no longer is changing as an indication that the X-ray exposure has terminated and when to activate the display 42. Therefore, the final measurement for the X-ray exposure will be displayed when the LED display 42 is illuminated. Thus, at the end of the X-ray exposure, the section of the photographic film 24 that is over the intensifier screen 20 contains the X-ray test image and the film section over the LED display 42 has recorded the digital value representing the magnitude of the X-ray exposure.

As shown in FIG. 3, the output of the electrometer 34, designated V-CAL, also is sent over a conductor of cable 50 which extends from the X-ray cassette housing 12 to a remote display unit 52. Typically, the X-ray display unit 52 is located adjacent the control panel for the X-ray system. The line carrying the V-CAL signal is applied to the input of a second analog to digital converter 54 which is similar to device 40 within the cassette 10. Output lines from the second analog to digital converter 54 are connected to a three and one-half digit, seven-segment display 56 that displays the X-ray exposure indicated by the output of electrometer 32.

The conductor carrying the V-CAL signal through cable 50 is connected in the remote display unit 52 by a pushbutton switch 58 to a RESET conductor of the cable. In the cassette 10, the RESET conductor is connected to a reset terminal of electrometer 32. When the pushbutton switch 58 is closed, an integrating capacitor within the integrator of electrometer 32 is discharged thereby resetting the integrator between test exposures.

The remote control 52 also includes a power supply 60, such as a battery, that generates the necessary voltage levels for powering both the remote control 52 and the circuitry within the cassette 10.

I claim:

1. An apparatus for evaluating an X-ray imaging system, which apparatus comprises:

a cassette having a section for receiving a sheet of photographic film;

an intensifier screen of a material that emits light in response to being stuck by X-rays and being positioned within said cassette so that emitted light will strike the sheet of photographic film;

a light sensor which produces an electrical signal in response to light from said intensifier screen;

a circuit connected to said light sensor and producing a digital value representing an amount of light which strikes said light sensor; and a light emitting device connected to said circuit to record the digital value on the photographic film.

2. The apparatus as recited in claim 1 wherein said circuit comprises:

an integrator that produces an output signal corresponding to integration of the electrical signal received from said light sensor; and an analog to digital converter which receives the output signal from said integrator and produces a digital value representing a magnitude of the output signal.

3. The apparatus as recited in claim 2 wherein said integrator comprises an integrating electrometer amplifier.

4. The apparatus as recited in claim 2 wherein said circuit further comprises a mechanism for resetting said integrator.

5. The apparatus as recited in claim 1 wherein said circuit produces a multi-digit, decimal numerical value representing a magnitude of the output signal; and wherein said light emitting device is a multi-digit, decimal display.

6. The apparatus as recited in claim 1 further comprising a control circuit which activates said light emitting device to record the digital value on the photographic film after termination of an X-ray exposure produced by the X-ray imaging system.

7. The apparatus as recited in claim 1 further comprising a display remote from and connected to the cassette for displaying, to a user, an indication of an amount of X-rays which strike said intensifier screen.

8. An apparatus for evaluating an X-ray imaging system, which apparatus comprises:

a cassette having a section for receiving a sheet of photographic film;

an intensifier screen of a material that emits light in response to being stuck by X-rays, and positioned within said cassette so that such emitted light strikes the sheet of photographic film;

a light sensor within said cassette and producing an electrical signal representing an intensity of light emitted by said intensifier screen;

an integrator having an input connected to said light sensor and producing an output signal;

an analog to digital converter having an input coupled to the output of said integrator and producing a digital value corresponding to the output signal of said integrator; and a light emitting display connected to said analog to digital converter to display the digital value as a multiple digit number which is recorded on the photographic film.

9. The apparatus as recited in claim 8 wherein said integrator comprises an integrating electrometer amplifier.

10. The apparatus as recited in claim 8 further comprising a mechanism for resetting said integrator.

11. The apparatus as recited in claim 8 further comprising a control circuit which activates said light emitting display to record the digital value on the photographic film after termination of an X-ray exposure produced by the X-ray imaging system.

12. The apparatus as recited in claim 8 wherein said analog to digital converter produces a multi-digit, decimal numerical value representing the magnitude of the output signal; and wherein said light emitting display is a multi-digit, decimal numeric display.

13. The apparatus as recited in claim 8 further comprising a numeric display remote from and connected to said cassette for displaying, to a user, an indication of an amount of X-rays which strike said intensifier screen.

14. The apparatus as recited in claim 13 wherein said numeric display comprises:

a conductor extending from said cassette and carrying the output signal produced by said integrator; and a multi-digit, decimal display device which displays the indication of an amount of X-rays which strike said intensifier screen.

* * * * *